United States Patent
Lendway, IV et al.

(10) Patent No.: US 7,229,113 B2
(45) Date of Patent: Jun. 12, 2007

(54) STRUCTURAL ASSEMBLY FOR VEHICLES AND METHOD OF MAKING SAME

(75) Inventors: Joseph M. Lendway, IV, Dryden, MI (US); Charles J. Bruggemann, Rochester Hills, MI (US); David A. Gatny, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 179 days.

(21) Appl. No.: 10/972,845

(22) Filed: Oct. 25, 2004

(65) Prior Publication Data

US 2006/0087153 A1  Apr. 27, 2006

(51) Int. Cl.
*B62D 29/00* (2006.01)
*B21D 53/88* (2006.01)

(52) U.S. Cl. .................. 296/30; 296/205; 29/897.2; 52/731.6

(58) Field of Classification Search ........... 296/187.01, 296/205, 30, 37.6, 43; 29/897.2; 52/731.6, 52/735.1
See application file for complete search history.

(56) References Cited

U.S. PATENT DOCUMENTS

| | | | |
|---|---|---|---|
| 6,434,907 B1* | 8/2002 | Simboli | 296/205 |
| 6,482,486 B1* | 11/2002 | Czaplicki et al. | 296/187.02 |
| 6,574,849 B1* | 6/2003 | Bohm | 29/897.2 |
| 6,623,067 B2* | 9/2003 | Gabbianelli et al. | 296/205 |
| 6,898,836 B2* | 5/2005 | Barber et al. | 29/510 |
| 2001/0050497 A1* | 12/2001 | Jaekel et al. | 296/205 |
| 2003/0037424 A1* | 2/2003 | Platner | 29/421.1 |
| 2003/0131643 A1* | 7/2003 | Janssen et al. | 72/55 |
| 2004/0119321 A1* | 6/2004 | Kasuga | 296/205 |
| 2005/0225120 A1* | 10/2005 | Womack et al. | 296/205 |
| 2005/0279049 A1* | 12/2005 | MacKenzie et al. | 52/730.4 |
| 2006/0097533 A1* | 5/2006 | Watanabe et al. | 296/30 |

* cited by examiner

*Primary Examiner*—Jason Morrow
(74) *Attorney, Agent, or Firm*—Laura C. Hargitt

(57) ABSTRACT

A structural assembly for a vehicle and method of making same includes a hydroformed tubular member extending axially, a reinforcement disposed within and generally perpendicular to an axis of the tubular member, and at least one securement to secure the reinforcement to the tubular member.

3 Claims, 4 Drawing Sheets

STRUCTURAL ASSEMBLY FOR VEHICLES AND METHOD OF MAKING SAME

TECHNICAL FIELD

The present invention relates generally to vehicles and, more specifically, to a structural assembly for a vehicle and method of making same.

BACKGROUND OF THE INVENTION

It is known to construct vehicles such as automotive vehicles with structural members. For some automotive vehicles such as pick-up trucks, a bed or box incorporates several structural members. Reinforcements are typically used to stiffen or strengthen structural members. Hydroformed reinforcements have been suggested to stiffen up the existing front and rear of the pick-up bed or box. These hydroformed reinforcements occupy the same space as the existing stamped steel stake pocket reinforcements, but are missing a bottom surface or floor of the stake pocket.

As a result, it is desirable to provide a structural assembly for a vehicle that has an integral reinforcement. It is also desirable to provide a structural assembly for a vehicle that has a stop or floor for a pocket of a hydroformed member. It is further desirable to provide a structural assembly for a vehicle that is less time consuming and costly to manufacture. Therefore, there is a need in the art to provide a structural assembly for of a vehicle that meets these desires.

SUMMARY OF THE INVENTION

Accordingly, the present invention is a structural assembly for a vehicle including a hydroformed tubular member extending axially, a reinforcement disposed within and generally perpendicular to an axis of the tubular member, and at least one securement to secure the reinforcement to the tubular member.

Additionally, the present invention is a method of making a structural assembly for a vehicle. The method includes the steps of providing a hydroformed tubular member and providing a reinforcement. The method also includes the steps of disposing the reinforcement within the tubular member and securing the reinforcement to the tubular member.

One advantage of the present invention is that a new structural assembly is provided for a vehicle that reinforces a hydroformed member. Another advantage of the present invention is that the structural assembly and method incorporates an integral reinforcement that is simple and relatively inexpensive. Yet another advantage of the present invention is that the structural assembly and method has integral reinforcements made from the side walls of various hydroformed members and the resultant side wall hole can be used as a weld access hole. Still another advantage of the present invention is that the structural assembly and method forms stake pocket floors into the ends of the hydroformed reinforcements for a bed or box of a pick-up truck. A further advantage of the present invention is that the structural assembly and method forms integral sound baffles into the ends of hydroformed members, roof rails, etc. to prevent the tubular members from carrying sound (road noise) into the occupant compartment of the vehicle. Yet a further advantage of the present invention is that the structural assembly and method has anti-crush features for improved impact performance. Still a further advantage of the present invention is that the structural assembly and method is a cost savings, piece count reduction, and potential mass savings over using separate stamped reinforcements or baffles. Another advantage of the present invention is that the structural assembly and method not only provides a large structural floor and reinforcement, but it is also weldable to the opposite side wall for additional strength and stiffness. Yet another advantage of the present invention is that the structural assembly and method also has a weld access hole for spot welding the structural assembly to the inner panel of the bed or box of the pick-up truck.

Other features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
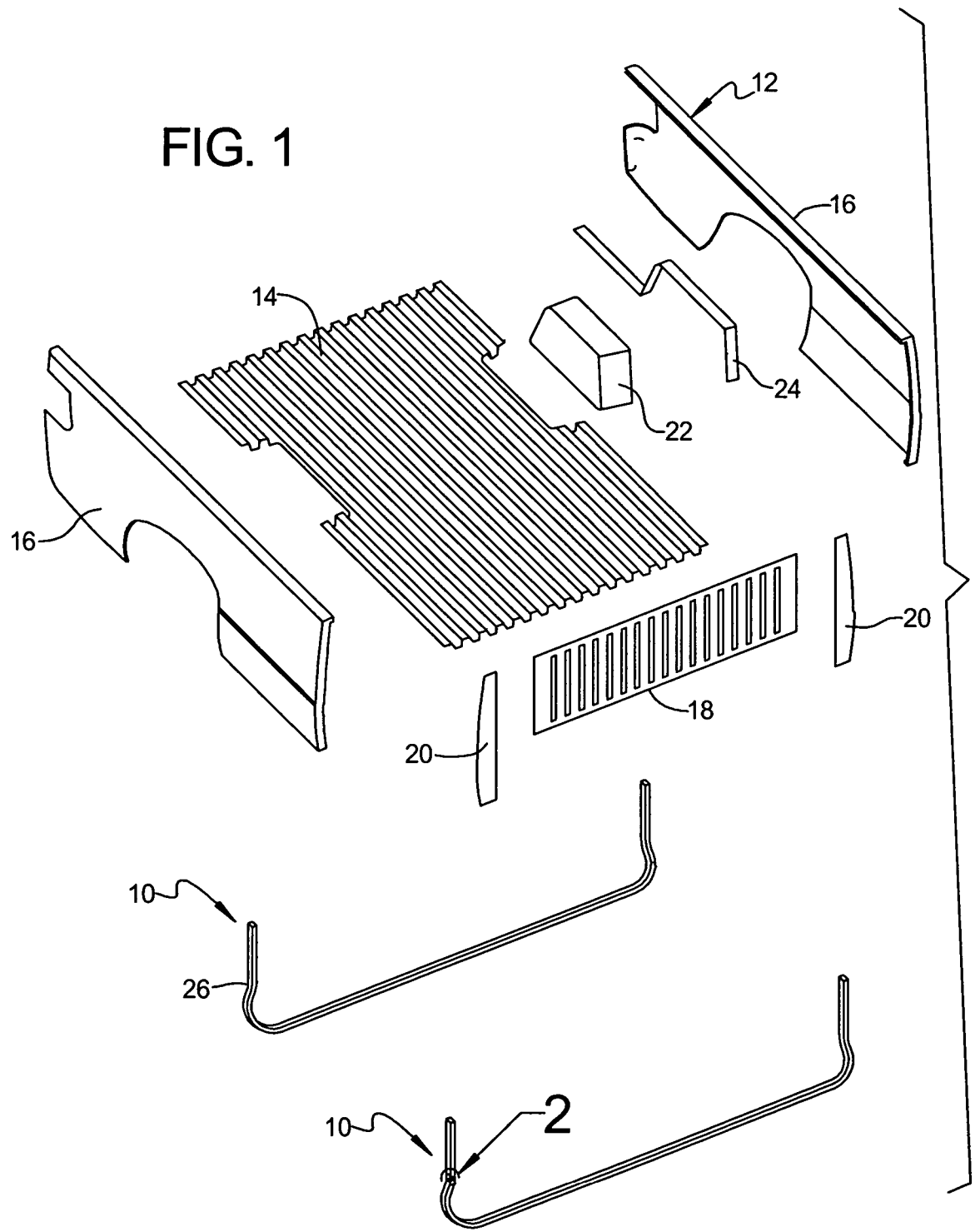
FIG. 1 is an exploded perspective view of a bed or box of a vehicle incorporating a structural assembly, according to the present invention.

Referring to the drawings and in particular FIG. 1, one embodiment of a structural assembly 10, according to the present invention, is shown for assembly in automotive structures (not shown) such as a bed or box, generally indicated at 12, for a vehicle such as a pick-up truck. Such pick-up trucks typically include a cab (not shown) forming an occupant compartment and a bed or box, generally indicated at 12, forming a cargo area. The bed 12 is generally rectangular in shape. The bed 12 includes a floor panel 14, two opposed side panels 16, a front panel 18, and a tailgate (not shown) that define the cargo area. The bed 12 also includes at least one, preferably a plurality, more preferably two, of the structural assemblies 10 to support the floor and side panels 14 and 16, respectively, one at the front and one at the rear of the bed 12. It should be appreciated that the bed 12 may include other panels such as front support panels 20, a wheel well 22, and a wheel wall support member 24 (only one shown) for each side thereof. It should also be appreciated that, except for the structural assemblies 10, the bed 12 is conventional and known in the art.

Figure 2:
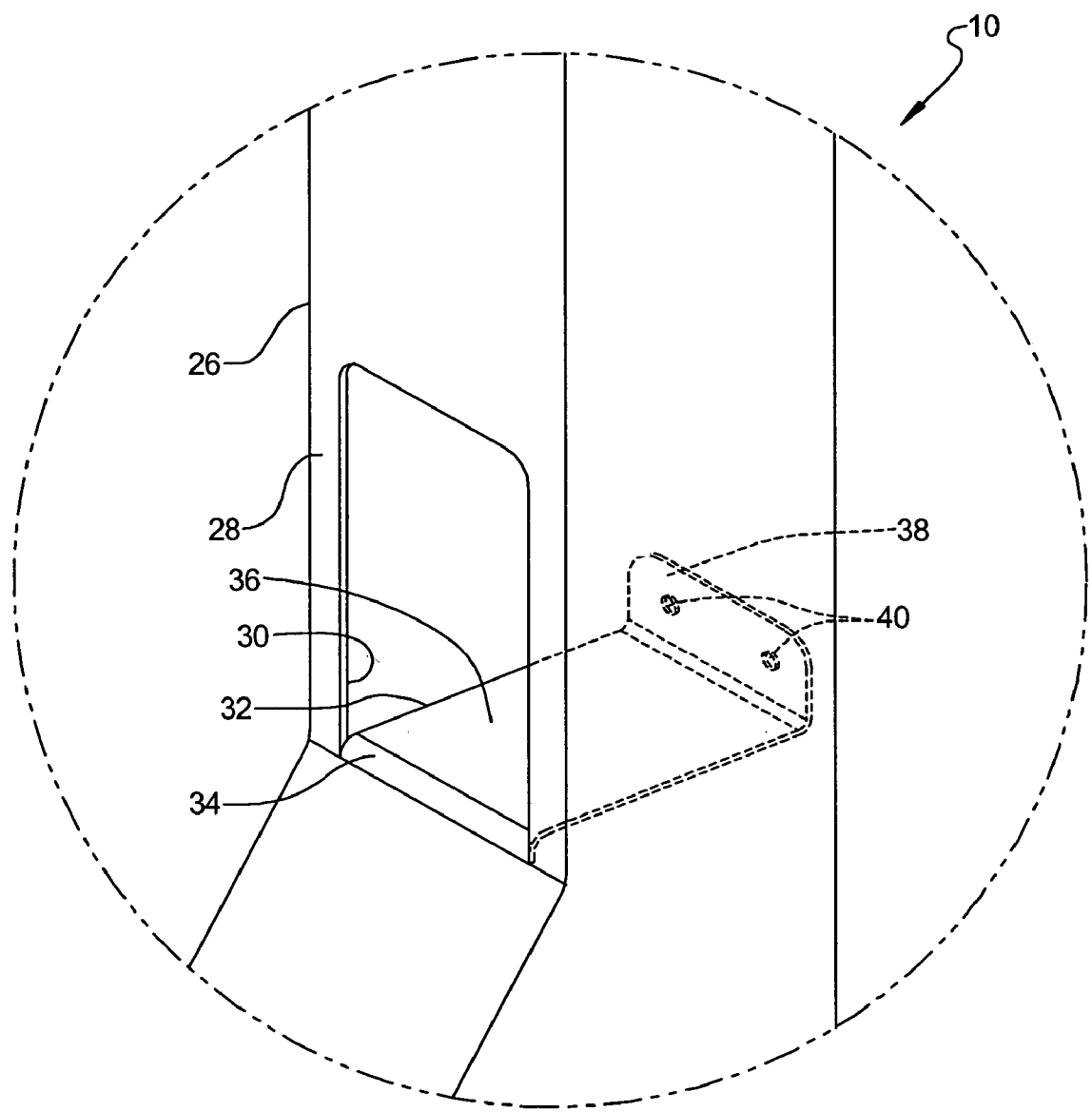
FIG. 2 is an enlarged perspective view of a portion of the structural assembly in circle 2 of FIG. 1.
Figure 7:
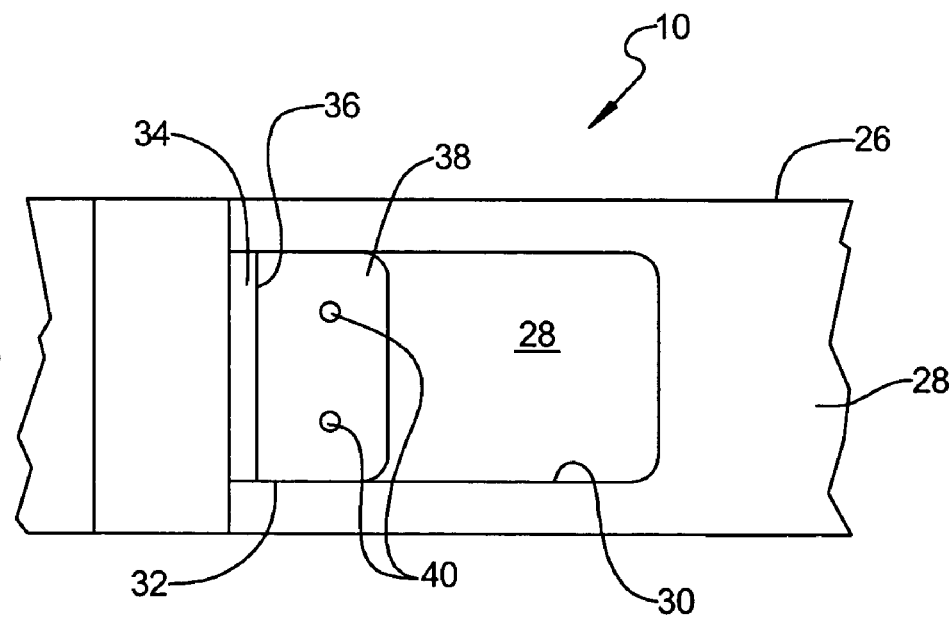
FIG. 7 is a bottom view of the portion of the structural assembly of FIG. 2.

Referring to FIGS. 2 and 7, each structural assembly 10 includes at least one tubular component or member 26. In one embodiment, the tubular member 26 extends axially and has a plurality of side walls 28 forming a generally rectangular and hollow cross-sectional shape. The tubular member 26 includes an opening or pocket 30 in one of the side walls 28. The tubular member 26 is made of a metal material and formed by a hydroforming process. The tubular member 26 is a monolithic structure being integral, unitary, and one-piece.

Each structural assembly 10 also includes at least one internal reinforcement 32 disposed within the tubular member 26. In one embodiment, the reinforcement 32 is a tab that is generally "Z" shaped. The reinforcement 32 has a first end wall 34 extending axially from the side wall 28 of the tubular member 26 adjacent to the opening 30. The first end wall 34 is generally rectangular in shape. The reinforcement 32 has a side wall 36 extending from the first end wall 34 and into the opening 30 toward the opposed side 28. The side wall 36 is generally rectangular in shape. The reinforcement 32 has a second end wall 38 extending from the side wall 36 and generally perpendicular to the side wall 28. The second end wall 38 is generally rectangular in shape. The second end wall 38 is disposed in abutting relationship with the side wall 28 of the tubular member 26. The reinforcement 32 is made of a metal material. The reinforcement 32 is a monolithic structure being integral, unitary, and one-piece. The reinforcement 32 and the tubular member 26 are integral, unitary, and one-piece.

The structural assembly 10 includes at least one, preferably a plurality of securements 40 to fixedly secure the second end wall 38 to the side wall 28 of the tubular member 26. More specifically, the second end wall 38 of the reinforcement 32 is spot welded to the side wall 28 of the tubular member 26 to form the securements 40 such as welds at predetermined points along the expanse thereof as illustrated in FIGS. 2 and 7. It should be appreciated that the second end wall 38 may be bonded by a suitable material such as an adhesive to the side wall 28 of the tubular member 26. It should also be appreciated that the reinforcement 32 and tubular member 26 are integral and one-piece.

Referring to FIGS. 3 through 6, a method, according to the present invention, of making the structural assembly 10 is shown. The method includes the step of providing at least one tubular member 26. The tubular member 26 is made of a metal material. In one embodiment, the tubular member 26 has a generally rectangular cross-sectional shape.

According to one method of hydroforming, a tubular member (not shown) is placed in a die set (not shown) comprised of an upper die half and a lower die half. The ends of the tubular member are sealed and hydraulic fluid is pumped into the tubular member under pressure. The upper die half and lower die half are progressively closed so that the tubular member is progressively deformed and the pressurized fluid captured therein expands the walls of the tubular member into cavity portions of the die halves.

Once the die is closed, the tubular member is then expanded to a final cross-sectional profile by increasing the hydraulic pressure sufficient to exceed the yield limit of the tubular member so that the tubular member is forced into conformity with the cavity portions of the die halves. The die halves are then opened to permit removal of the finished tubular member 26 from the die halves. It should be appreciated that other methods of hydroforming may involve substitution of pre-forming for the initial pressure stage.

The method includes the step of providing the reinforcement 32. The method includes the step of forming the reinforcement 32. The reinforcement 32 is pierced, hydropierced, cut (laser, plasma, etc.) or trimmed from the surface of one or more of the side walls 28 of the tubular member 26. Preferably, the reinforcement 32 is formed by hydropiercing one side wall 28 of the tubular member 26.

Figure 3:
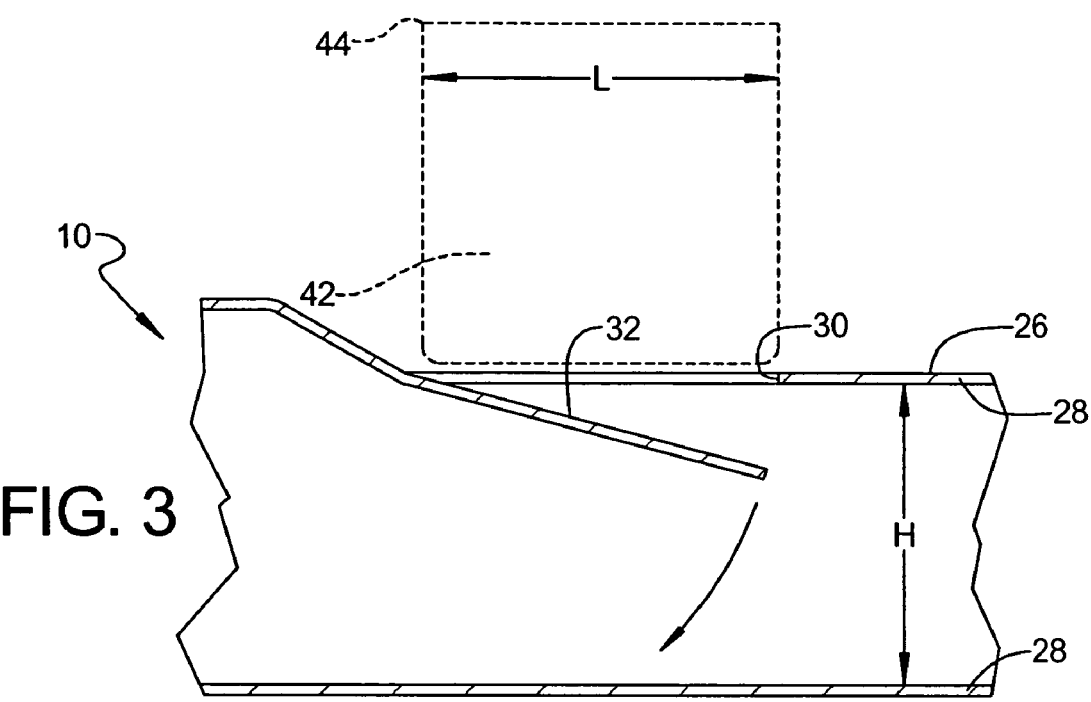
FIG. 3 is a fragmentary elevational view of the portion of the structural assembly of FIG. 2 illustrating a first step of a method, according to the present invention, of making the structural assembly of FIG. 2.

As illustrated in FIG. 3, a nominally rectangular punch 42 is provided having one of its sides of sufficient length, L, to equal the distance across the depth, H, of the tubular member 26, measured in the direction of the punch travel, and an additional length A (FIG. 5), of the reinforcement 32 in contact with the side wall 28 of the tubular member 26 opposite the punch 42 with adequate weld or bonding surface dimension. The punch 42 has corners that are rounded and one straight edge 44 that is blunted or chamfered to prevent shearing of the slug (reinforcement 32) along that length, thereby enabling the formation of a hinge line, 46 (FIG. 5), for the remainder of the reinforcement 32 as it is pierced from the side wall 28 of the tubular member 26. It should be appreciated that this hinging edge is at the opposite side of the punch face from the portion of the reinforcement 32 that is formed against the opposing side wall 28 of the tubular member 26.

Figure 4:
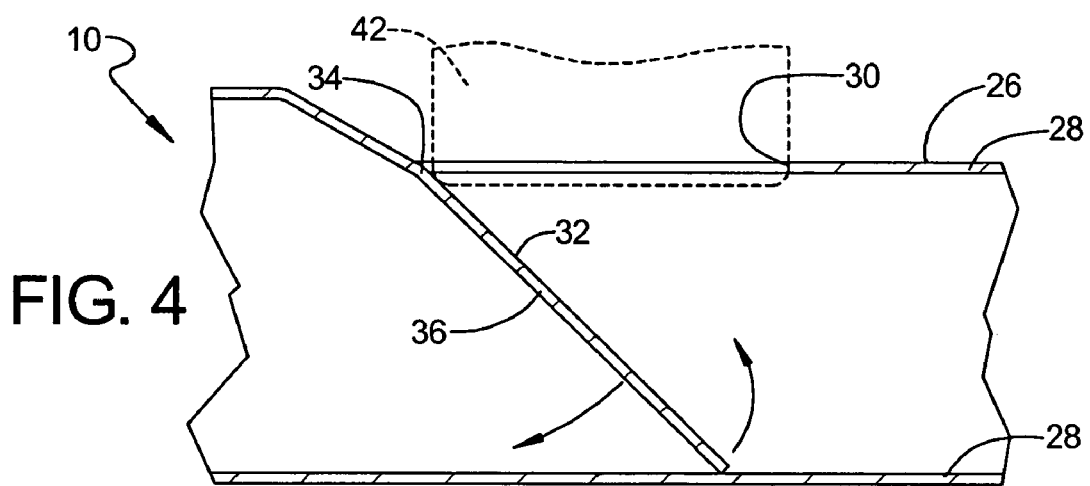
FIG. 4 is a view similar to FIG. 3 illustrating a second step of the method of making the structural assembly of FIG. 2.

After the tubular member 26 has been pressurized to its final forming pressure, the hydropiercing punch 42 is activated to punch the reinforcement 32 into the interior of the tubular member 26. The reinforcement 32 is bent inward toward the opposed side wall 28 to form the opening 30 in the tubular member 26 and to form the first end wall 34 and side wall 36 of the reinforcement 32 as illustrated in FIG. 4. The sharp portion of the edge of the punch 42 shears the reinforcement 32 from the side wall 28 of the tubular member 26. The blunted or chamfered edge 44 of the punch 42 provides the hinge line 46 along which the reinforcement 32 remains attached to the side wall 28 of the tubular member 26.

Figure 5:
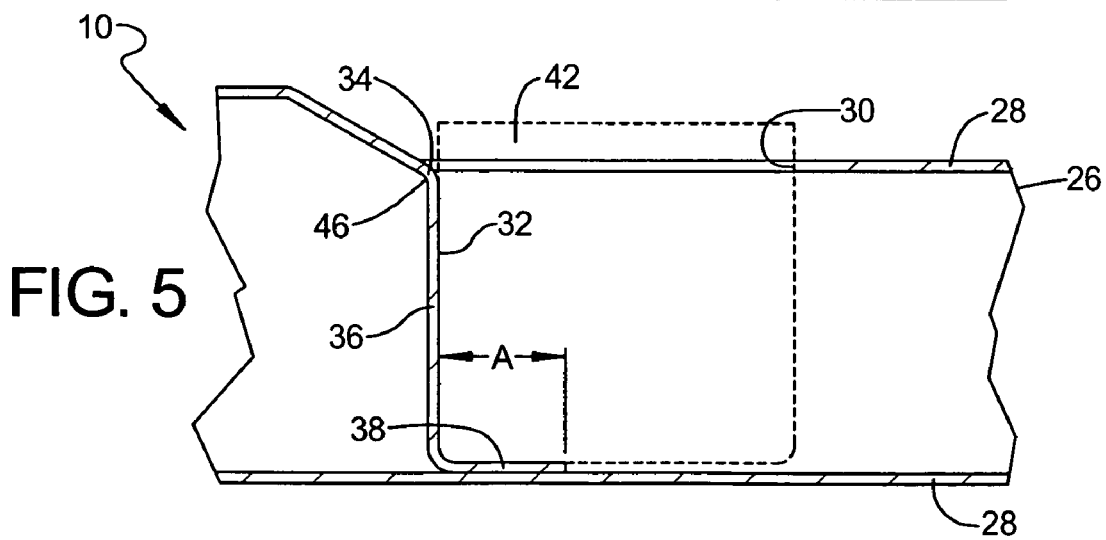
FIG. 5 is a view similar to FIG. 3 illustrating a third step of the method of making the structural assembly of FIG. 2.

During the initial part of the travel of the punch 42, the body of the reinforcement 32 is pierced from the side wall 28 of the tubular member 26 and is rotated along the hinge line 46 under the influence of the advancing punch 42. At some point in the rotation, the edge of the reinforcement 32 opposite to the hinge line 46 contacts the opposite surface of the tubular component 26. The travel of the punch 42 is caused to continue until the punch 42 has made contact with the opposite wall 28 of the tubular member 26, and in so doing folds the "extra" length of the reinforcement 32 and causes it to conform to the opposite side wall 28 of the tubular member 26. The reinforcement 32 is then formed to bridge across the section and the end of the side wall 36 is bent approximately ninety degrees (90°) (or whatever angle the opposites side wall is) to form the second end wall 38 which acts as a welding or adhesive bonding flange as illustrated in FIG. 5.

Figure 6:
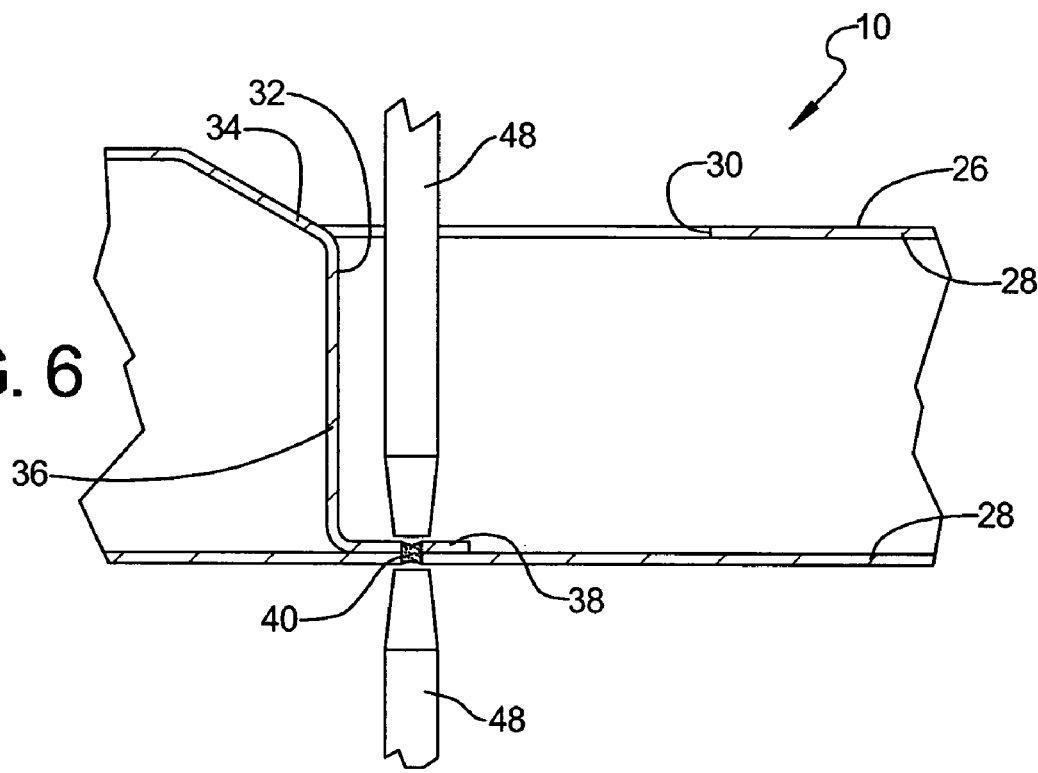
FIG. 6 is a view similar to FIG. 3 illustrating a fourth step of the method of making the structural assembly of FIG. 2.

The method includes the step of securing the second end wall 38 to the side wall 28 of the tubular member 26. The second end wall 38 is secured to the opposite surface of the side wall 28 by at least one securement 40 such as welding, preferably spot welding with electrodes 48 as illustrated in FIG. 6. It should be appreciated that the opening 30 acts as a weld access hole for spot welding of the structural assembly 10 to the inner panel 16 of the bed 12. It should be also appreciated that the reinforcement 32 acts a stop, close-out, floor, internal section reinforcement, collision anti-crush feature or sound baffle for the tubular member 26.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of making a structural assembly for a vehicle, said method comprising the steps of:
   providing a hydroformed tubular member;
   providing a reinforcement by forming the reinforcement through hydropiercing the tubular member;
   disposing the reinforcement within the tubular member; and
   securing the reinforcement to the tubular member.

2. A method of making a structural assembly for a vehicle, said method comprising the steps of:
   providing a hydroformed tubular member;
   providing a reinforcement;
   disposing the reinforcement within the tubular member;
   securing the reinforcement to the tubular member; and
   wherein said step of disposing the reinforcement within the tubular member comprises punching the reinforcement into an interior of the tubular member.

3. A method of making a structural assembly for a vehicle, said method comprising the steps of:
   hydroforming a tubular member having a generally rectangular cross-sectional shape;
   hydropiercing the tubular member and forming a reinforcement;
   punching the reinforcement into an interior of the tubular member; and
   securing the reinforcement to the tubular member by welding an end wall of the reinforcement to a surface of the tubular member.

* * * * *